United States Patent
Ryu

(10) Patent No.: US 9,020,331 B2
(45) Date of Patent: Apr. 28, 2015

(54) VIDEO IMAGE INFORMATION PLAYBACK METHOD AND VIDEO IMAGE INFORMATION PLAYBACK DEVICE

(75) Inventor: Tomoaki Ryu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/236,308

(22) PCT Filed: May 23, 2012

(86) PCT No.: PCT/JP2012/063121
§ 371 (c)(1),
(2), (4) Date: Jan. 30, 2014

(87) PCT Pub. No.: WO2013/057977
PCT Pub. Date: Apr. 25, 2013

(65) Prior Publication Data
US 2014/0169762 A1     Jun. 19, 2014

(30) Foreign Application Priority Data

Oct. 21, 2011   (JP) ................................ 2011-231903

(51) Int. Cl.
*H04N 5/84*     (2006.01)
*G11B 20/00*    (2006.01)
(Continued)

(52) U.S. Cl.
CPC ........ *G11B 20/00086* (2013.01); *G11B 27/105* (2013.01); *G11B 2220/2541* (2013.01); *G11B 27/102* (2013.01); *G06F 21/12* (2013.01)

(58) Field of Classification Search
CPC .......... H04N 21/6587; H04N 21/2387; H04N 9/8205; H04N 5/85; H04N 21/42646; G11B 2220/2541; G11B 2220/2562; G11B 2220/2537; G11B 2220/2579
USPC .................. 386/259, 335, 336, 349, 350–351
See application file for complete search history.

(56) References Cited

U.S. PATENT DOCUMENTS

| 8,127,168 B2 | 2/2012 | Maeda et al. |
| 8,233,770 B2 | 7/2012 | Kiyama et al. |

(Continued)

FOREIGN PATENT DOCUMENTS

| EP | 2 378 522 A1 | 10/2011 |
| JP | 2006-107586 A | 4/2006 |

(Continued)

*Primary Examiner* — Helen Shibru
(74) *Attorney, Agent, or Firm* — Birch, Stewart, Kolasch & Birch, LLP

(57) ABSTRACT

A video image information playback method and a video image information playback device with which user convenience can be obtained at the start of resume playback. The video image information playback method is a method of playback of a recording medium on which virtual-machine-based content has been recorded. During normal playback of the virtual-machine-based content, a program running on a virtual machine and a decryption program that decrypts encrypted virtual-machine-based content perform decryption processing for the virtual-machine-based content while exchanging data. After suspension of playback of the virtual-machine-based content, at the start of resume playback, which is executed following an instruction to resume playback, a proxy program is launched in place of the program that runs on the virtual machine. The proxy program and the decryption program perform playback of the video image of the virtual-machine-based content while exchanging data.

6 Claims, 15 Drawing Sheets

(51) Int. Cl.
*G11B 27/10* (2006.01)
*G06F 21/12* (2013.01)

(56) References Cited

U.S. PATENT DOCUMENTS

| | | | | |
|---|---|---|---|---|
| 8,717,857 B2* | 5/2014 | Spitzlinger et al. | ........ | 369/30.09 |
| 2006/0140079 A1* | 6/2006 | Hamada et al. | .............. | 369/47.1 |
| 2010/0008653 A1* | 1/2010 | Iwasaki et al. | ................. | 386/125 |
| 2010/0329087 A1* | 12/2010 | Baek | .......................... | 369/30.26 |
| 2011/0032327 A1* | 2/2011 | Ikeda et al. | ...................... | 348/42 |
| 2011/0122740 A1* | 5/2011 | Kawakami et al. | ......... | 369/30.04 |
| 2011/0211808 A1* | 9/2011 | Ryu | .............................. | 386/234 |
| 2012/0057849 A1 | 3/2012 | Ryu | | |

FOREIGN PATENT DOCUMENTS

| | | |
|---|---|---|
| JP | 2009-193642 A | 8/2009 |
| JP | 2009-232123 A | 10/2009 |
| JP | 2009-259356 A | 11/2009 |
| JP | 2009-289400 A | 12/2009 |
| JP | 2009-289401 A | 12/2009 |
| JP | 2010-033628 A | 2/2010 |
| JP | 2010-277618 A | 12/2010 |
| WO | WO 2009/004757 A1 | 1/2009 |
| WO | WO 2010/064433 A1 | 6/2010 |

* cited by examiner

```
xxx.plst(){
    number_of_stream
    for(stream_id=0; stream_id < number_of_stream;stream_id++){
        stream_file_name;
        in_time;
        out_time;
    }
}
```

```
zzz.clip(){
    stream_info();
    index_info(){
        number_of_GOP;
        for(GOP_id=0; GOP_id < number_of_GOP;GOP_id++){
            start_PTS;
            relative_byte;
        }
    }
}
```

```
Movie.title(){
        number_of_title
        for(title_id=0; title_id < number_of_title;title_id++){
                title_type;
                title_attribute;
                if(title_type == 1){
                        JAR_file_name;
                }
                else{
                        PlayListL_file_name;
                }
        }
        next_title_id;
}
```

FIG. 8

```
package testappli;

import java.awt.Graphics;
import java.awt.Image;
    .
    .
import org.disc.net.DiscLocator;
    .
    .
```
T1

```
public class Test implements Xlet {
        private Timer1Task timer_tsk = null;
        private DiscLocator discLocator = null;
            .
            .
            .
        private int iPlayListID = 0;

private final int XPOS = 256;
        private final int YPOS = 256;

private final int I_POS[][] = {
                        {0,   0, 128, 128},
                        {0, 128, 128, 256},
                            .
        };
            .
            .
            .
            .
```
T2

```
public void startXlet() throws XletStateChangeException {
    scene = HSceneFactory.getInstance().getDefaultHScene();
    scene.setVisible(true);
    gr = scene.getGraphics();
```

```
    try {
        ClassLoader classLoader = getClass().getClassLoader();
        Toolkit toolkit = Toolkit.getDefaultToolkit();
        mediaTracker = new MediaTracker(scene);
        int index = 0;
        URL       urlkey = classLoader.getResource(test_img.png);
        decode_img = toolkit.getImage(urlkey);
        mediaTracker.addImage(decode_img, index);
        mediaTracker.waitForAll();
    }
    catch (Exception e){}
```
T3

```
    try {
        iPlayListID = 0;
        discLocator = new DiscLocator(iPlayListID);
        mediaLocator = new MediaLocator(discLocator);
        player = Manager.createPlayer(mediaLocator);
        player.prefetch();
        player.start();
    } catch (Exception e){} while(true){
        try{
            wait(100);
        }catch(Exception e){}
        if(player.getMediaTime().getSeconds() > 5.0f )break;
    }
```
T4

```
    try {
        iPlayListID = 1;
        discLocator = new DiscLocator(iPlayListID);
        mediaLocator = new MediaLocator(discLocator);
        player = Manager.createPlayer(mediaLocator);
        player.prefetch();
        player.start();
    } catch (Exception e){} while(true){
        try{
            wait(100);
        }catch(Exception e){}
        if(player.getMediaTime().getSeconds() > 5.0f )break;
    }
```
T5

```
    try {
        iPlayListID = 2;
        discLocator = new DiscLocator(iPlayListID);
        mediaLocator = new MediaLocator(discLocator);
        player = Manager.createPlayer(mediaLocator);
        player.prefetch();
        player.start();
    } catch (Exception e){} while(true){
        try{
            wait(100);
        }catch(Exception e){}
        if(player.getMediaTime().getSeconds() > 5.0f )break;
    }
```
T6

```
    Menu();
```
T7

```
private void execPlayList(int index){
    clear(0,0,1920,1080);
    try {
        iPlayListID = 3;
        discLocator = new DiscLocator(iPlayListID);
        mediaLocator = new MediaLocator(discLocator);
        player = Manager.createPlayer(mediaLocator);
        player.prefetch();
        player.start();
    }
    catch (NoPlayerException e){}
    catch (IOException e){}
    catch (InvalidLocatorException e){} timer_tsk = new Timer1Task();

Menu();
} public void destroyXlet(boolean arg0) throws XletStateChangeException {
} public class Timer extends TimerTask {
    public Timer timer1;
    int iCnt = 0;

public Timer1Task(){
        Timer timer1 = new Timer();
        timer1.schedule(this, 0, 1000);
    } public synchronized void run() {
        iCnt++;
        if(iCnt <= 30){
            gr.drawImage( decode_img, XPOS, YPOS, XPOS+128, YPOS+128,I_POS[index][0], I_POS[index][1],
            I_POS[index][2], I_POS[index][3],null);
            return;
        }
    }
}
```

T8

FIG. 11(a)
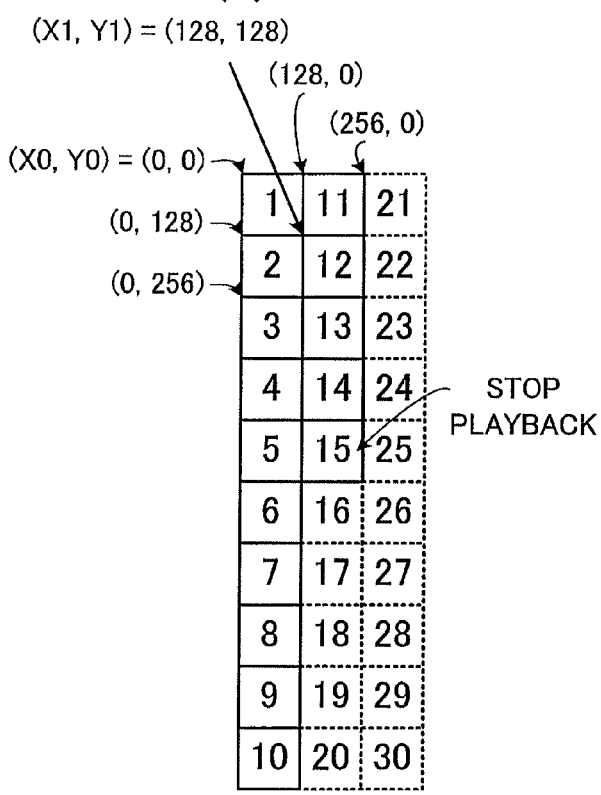
FIG. 11(b)
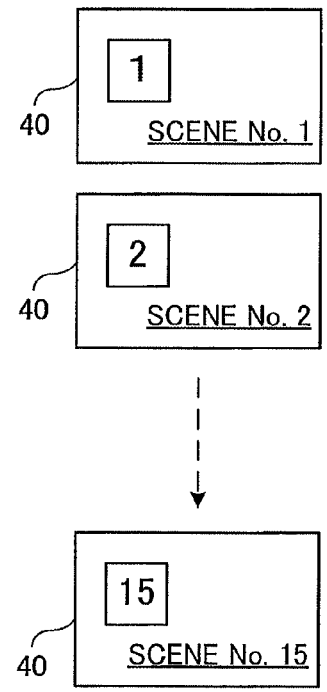
FIG. 12
```
xxx.plst(){
    number_of_stream
    for(stream_id=0; stream_id < number_of_stream;stream_id++){
        stream_file_name;
        in_time;
        out_time;
        menu_flag;
    }
}
```

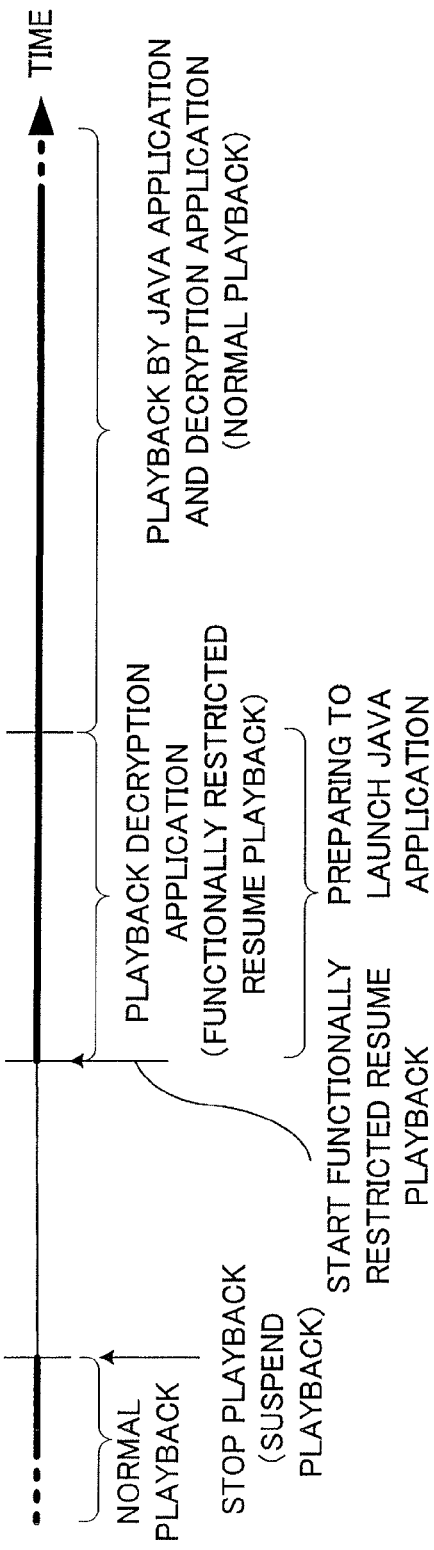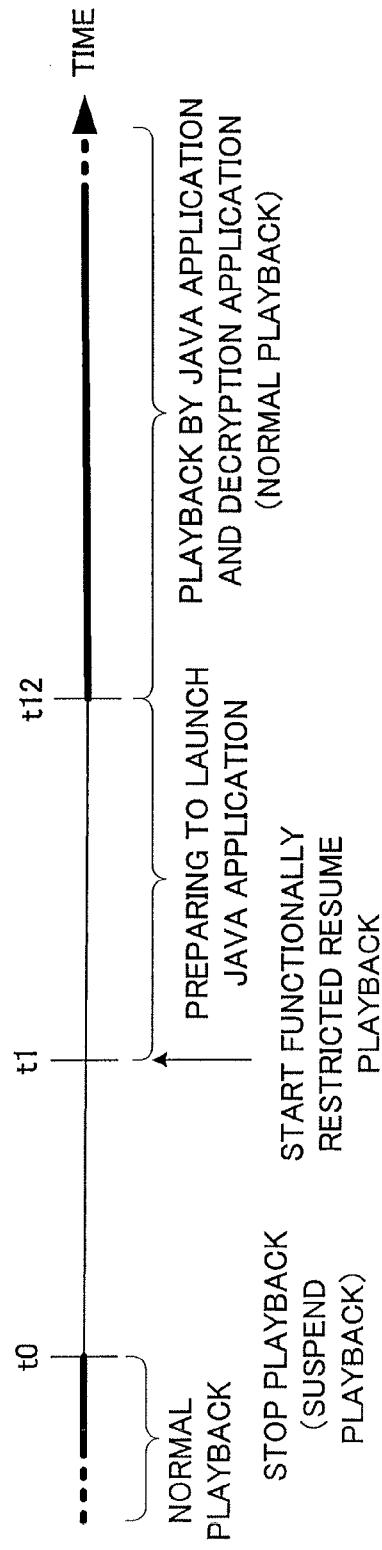

VIDEO IMAGE INFORMATION PLAYBACK METHOD AND VIDEO IMAGE INFORMATION PLAYBACK DEVICE

TECHNICAL FIELD

The present invention relates to a video image information playback method for playing back a video picture from a recording medium in which virtual-machine-based content capable of controlling playback of the video picture by a program running on a virtual machine is recorded, and to a video image information playback device.

BACKGROUND ART

One type of device for playing back image content such as movies and dramas is a DVD player. Navigation commands constituting a relatively simple control language are used to control video image playback on a DVD player. In addition, Java virtual machines are used to enable the viewing of complex content with high interactivity on Blu-ray disc (BD) players, which have recently started to come into widespread use (see Patent Reference 1, for example).

The playback data on a DVD include video image data, audio data, graphic data, and video control data, which are combined into a single file. On a DVD player, when playback is stopped (interrupted or suspended) and then restarted (resumed), after a wait of a few seconds, the playback is resumed from the position at which it was stopped. In this case, since the video image data, audio data, and other data required for playback are all combined into a single file, the playback can be resumed from the stopping position by re-reading a management information file with a small data size from the optical disc, and thus the wait time for playback resumption is short.

In playback of content using a Java application (Java-virtual-machine-based content) on a Blu-ray disc (BD), however, when playback is stopped and then resumed, the playback operation must be performed from the initial state in which the BD was loaded into the video image information playback device, and the Java application running on the virtual machine must be restarted, so it takes several tens of seconds or several minutes for playback to resume from the previous stopping position. To avoid this, one conceivable method of reducing the time to the resumption of playback is to treat content using a Java application as if it were content not using a Java application.

PRIOR ART REFERENCES

Patent Reference

Patent Reference 1: Japanese Patent Application Publication No. 2009-193642

SUMMARY OF THE INVENTION

Problem to be Solved by the Invention

For some virtual-machine-based content, however, when encrypted video image data or audio data are decrypted, in some cases the encrypted data are decrypted by data exchange between a decryption application and a Java application. If resume playback of such content is performed without launching the Java application, it becomes impossible to decrypt the video image data or audio data, so the Java application must be restarted. There has therefore been the problem that user convenience is significantly impaired at the start of resume playback on a BD player.

The present invention addresses the above problem with the object of providing a video image information playback method and a video image information playback device that, at the start of resume playback, can start playback quickly and normally from a recording medium on which virtual-machine-based content is recorded.

Means of Solving the Problem

A video image information playback method according to the invention is a method of playing back a recording medium on which virtual-machine-based content is recorded, enabling video playback to be controlled by a plurality of programs running on a virtual machine. In normal playback of the virtual-machine-based content, a decryption support program, which is one of the plurality of programs running on the virtual machine, receives a numeric value from a decryption program for decrypting encrypted virtual-machine-based content; the decryption support program executes a prescribed computation by using the numeric value; the decryption program executes a decryption process by using a result of the computation; and at the start of resume playback, which is executed following an instruction to resume playback after playback of the virtual-machine-based content is suspended, a proxy program that runs in an environment other than the virtual machine is launched in place of the decryption support program that runs on the virtual machine, and the video playback of the virtual-machine-based content is executed as the proxy program and the decryption program exchange data.

A video image information playback device according to the invention includes a playback unit for playing back a recording medium on which virtual-machine-based content is recorded, enabling video playback to be controlled by a program running on a virtual machine, and a playback control unit for controlling playback processing in the playback unit. In normal playback of the virtual-machine-based content, a decryption process for the virtual-machine-based content is executed by a decryption support program running on the virtual machine in the playback control unit and a decryption program for decrypting the encrypted virtual-machine-based content running on a decryption control unit in the playback unit. At the start of resume playback, which is executed following an instruction to resume playback after playback of the virtual-machine-based content is suspended, a proxy program that runs in an environment other than the virtual machine is launched in place of the decryption support program that runs on the virtual machine in the playback control unit, and the video playback of the virtual-machine-based content is executed as the proxy program and the decryption program exchange data.

Effect of the Invention

According to the invention, since resume playback is performed by executing, in place of a program running on a virtual machine, a proxy program running in an environment other than the virtual machine, at the start of resume playback, playback can be started normally and quickly from a recording medium on which virtual-machine-based content is recorded.

BRIEF DESCRIPTION OF THE DRAWINGS

FIG. 8 is a diagram (1/3) illustrating source code of a Java application program.

FIG. 9 is a diagram (2/3) illustrating the source code of the Java application program.

FIG. 10 is a diagram (3/3) illustrating the source code of the Java application program.

FIGS. 11(a) and 11(b) are diagrams showing exemplary graphic images displayed by the Java application.

FIG. 12 is a diagram illustrating the syntax of a plst file related to the video image information playback method according to the embodiment of the invention.

FIGS. 17(a) and 17(b) are timing diagrams illustrating processes at the start of content playback in video image information playback methods in comparative examples 1 and 2, respectively.

MODE FOR CARRYING OUT THE INVENTION

Figure 1:
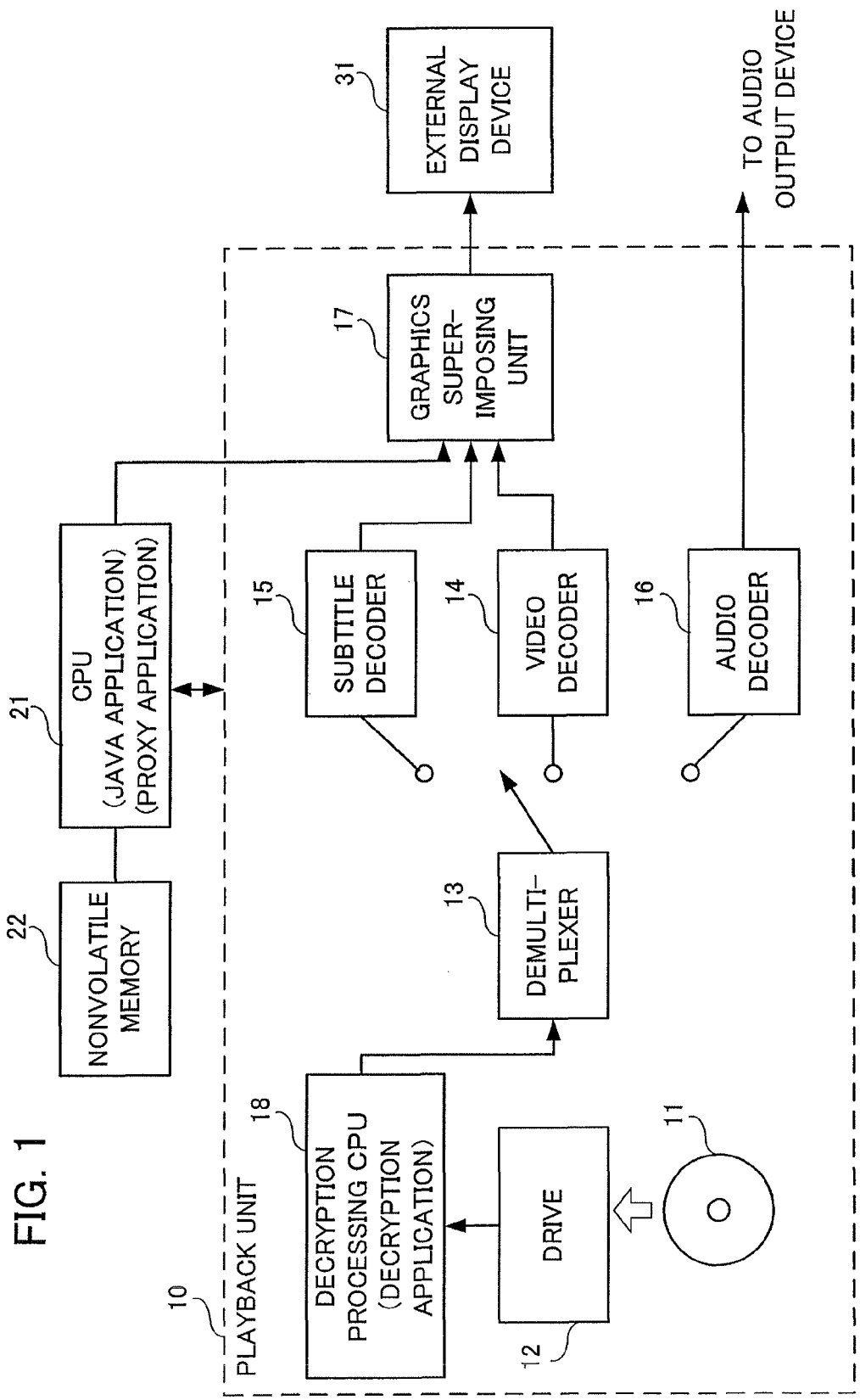
FIG. 1 is a block diagram schematically illustrating the configuration of a video image information playback device according to an embodiment of the present invention.

FIG. 1 is a block diagram schematically illustrating the configuration of a video image information playback device according to an embodiment of the invention. The video image information playback device according to this embodiment is intended to play back a recording medium on which content (virtual-machine-based content) the video playback of which can be controlled by an application program running on a virtual machine (referred to below as 'a program running on a virtual machine', or also as 'an application'). Exemplary recording media on which such content is recorded are optical discs such as DVDs, CDs, and Blu-ray discs, but other types of recording media, such as nonvolatile semiconductor memory and the like, may be used. The description of this embodiment will concern the case in which the recording medium is a Blu-ray disc (BD) and the virtual machine is a Java® virtual machine.

The video image information playback device illustrated in FIG. 1 includes a playback unit 10 for playing back an optical disc (BD) 11 as an exemplary recording medium, a CPU 21, which is a playback control unit for controlling the entire device and executing a Java application (a program running on a virtual machine), and a nonvolatile memory 22. The playback unit 10 includes a drive 12, a decryption processing CPU 18 used as a decryption control unit, a demultiplexer 13, a video decoder 14, a subtitle decoder 15, an audio decoder 16, and a graphics superimposing unit 17.

The drive 12 reads information from the optical disc 11 and outputs it to the decryption processing CPU 18. The decryption processing CPU 18 decrypts the received information and outputs the information to the demultiplexer 13. The demultiplexer 13 separates the data read by the drive 12 into video image information, audio information, and subtitle graphic information. The video decoder 14 decodes the video image information, the subtitle decoder 15 decodes the subtitle graphic information, and the audio decoder 16 decodes the audio information. The graphics superimposing unit 17 superimposes graphics information displayed by the Java application, input from CPU 21, on the decoded video image information and decoded subtitle graphic information. The video image signal output from the graphics superimposing unit 17 is sent to an external display device 31, and the external display device 31 displays the video picture. An audio signal output from the audio decoder 16 is sent to an audio output device, from which sound is output.

In the video image information playback device according to the embodiment, when a stop operation is performed during playback of the main video picture of virtual-machine-based content using a Java application and playback is then restarted from the stopping position, CPU 21 can resume playback and exchange data with the decryption processing CPU 18 (the decryption application) (corresponding to the case in the comparative example in FIG. 17(b), described later). This playback method, however, increases the wait time to playback resumption, which impairs user convenience. In the video image information playback device and method in this embodiment, therefore, at the start of resume playback, which is executed after an instruction to resume playback is given, instead of the Java application running on the virtual machine, a proxy application is launched as a proxy program running in an environment other than the virtual machine, and the proxy application and the decryption program execute video image playback of the virtual-machine-based content while exchanging data with each other, thereby achieving normal playback at the start of resume playback.

Figures 2, 3:
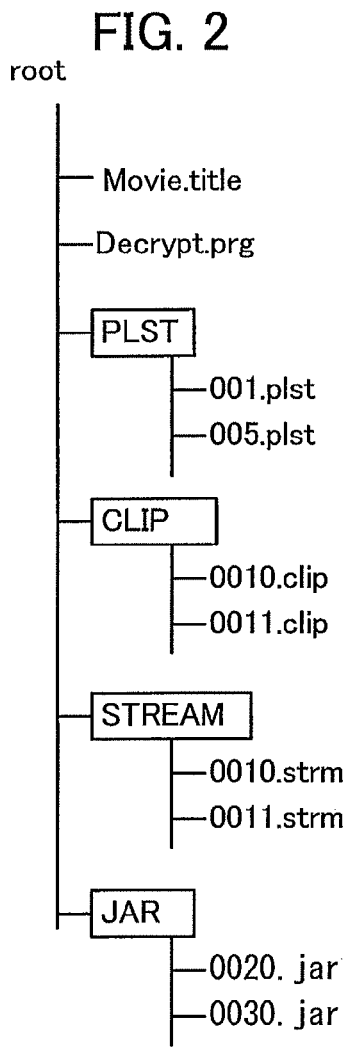
FIG. 2 is a diagram illustrating an exemplary directory structure in a recording medium according to the invention.
FIG. 3 is a diagram showing an example of the syntax of a plst file.

FIG. 2 is a diagram showing an example of the structure of files and directories that are recorded on the optical disc 11 and are necessary for playing back a BD. In FIG. 2, the "Movie.title" file gives information necessary for controlling a title, which is the highest hierarchical unit of playback. "PLST" in FIG. 2 denotes a PLST folder that stores files giving information necessary for playback control of a playlist (PlayList). In the PLST folder there are a plurality of plst files, denoted "xxx.plst", where "xxx" is a three-digit number. "STREAM" in FIG. 2 denotes a STREAM (stream) folder that stores files necessary for playback, such as video image information, audio information, and graphics information. In the STREAM folder there are a plurality of stream files, denoted "yyy.strm", where "yyy" is a three-digit number. A stream file is a file including a TS (transport stream) as adopted in digital broadcasting, in which video image information, audio information, and graphics information are superimposed with unique packet IDs. "CLIP" in FIG. 2 is a CLIP folder that stores clip files giving information necessary for playback control of the stream files. In the CLIP folder there are a plurality of clip files denoted "zzz.clip", where "zzz" is a three-digit number. The clip files and stream files are in one-to-one correspondence. For example, if the CLIP folder has a "123.clip" clip file, the STREAM folder has a "123.strm" stream file that corresponds to "123.clip". "JAR" in FIG. 2 is a JAR (Java Archive) folder that stores applications for title playback control running on the Java virtual machine. In the JAR folder there are jar files YYY.jar, each a ZIP format file in which a set of files necessary for running a Java application is compressed, "YYY" being a three-digit number. The "Decrypt.prg" file in FIG. 2 is a file that stores a program for decrypting encrypted content. The detailed operation of the "Decrypt.prg" file will be described later.

FIG. 3 is a diagram showing an example of the syntax of a plst file "xxx.plst". In FIG. 3, "number_of_stream" denotes the total number of the stream files to be played back in the playlist (PlayList). The "for" loop is repeated "number_of_stream" times. The "stream_file_name" in the loop gives the file name of the stream file to be played back; "in_time" and "out_time" give the start time and end time of the part to be played back in the stream file. These times are given in a PTS (Presentation Time Stamp) which is added to each packet in the stream file.

Figures 4, 5:
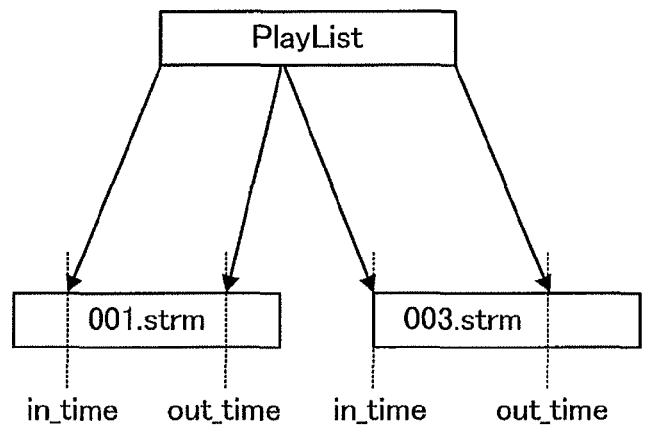
FIG. 4 is a diagram illustrating an exemplary relationship between a playlist and stream files.
FIG. 5 is a diagram showing an example of the syntax of a clip file.

FIG. 4 is a diagram showing an example of the relationship between a playlist (PlayList) indicated by a plst file in FIG. 2 and the stream files. When the playlist shown in FIG. 4 is played back, the part from "in_time" to "out_time" in "001.strm" and the part from "in_time" to "out_time" in "003.strm" are played back successively.

FIG. 5 is a diagram showing an example of the syntax of a clip file "zzz.clip" in FIG. 2. The information given in the clip file in FIG. 5 includes superimposition information for the video image information, audio information, and other information in the corresponding stream file, and index information necessary for random access and the like. "stream_info( )" gives attribute information for the superimposed video image information, audio information, and graphics information. As "stream_info( )" does not directly concern the present invention, a detailed description will be omitted. "index_info( )" gives time information and positional information about the head of each GOP in the stream file. The total number of GOPs (Groups of Pictures) included in the stream file is denoted "number_of_GOP". The following 'for' loop is repeated "number_of_GOP" times. The PTS information of the I-picture at the head of a GOP is denoted "start_PTS". The relative byte number from the head of the stream file to the head of the I-picture is denoted "relative_byte".

Figures 6, 7:
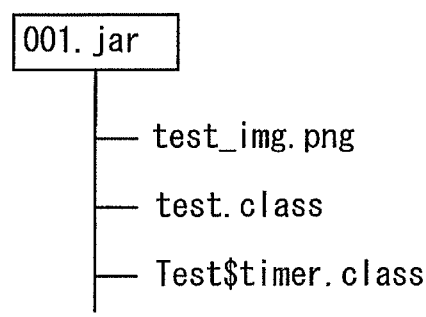
FIG. 6 is a diagram showing an example of the syntax of a Movie.title file.
FIG. 7 is a diagram showing an example of the structure of a jar file.

FIG. 6 is a diagram showing an example of the syntax of the "Movie.title" file. When the optical disc 11 is loaded into the drive 12, the drive 12 first reads the "Movie.title" file from the optical disc 11 under control of CPU 21. In FIG. 6, "number_of_title" denotes the total number of titles recorded on the optical disc 11. The following 'for' loop is repeated "number_of_title" of times. "title_type" is set to "1" if the title content uses a Java application, and to "0" if the title content does not use a Java application. "title_attribute" is set to "1" if the title concerned is a title for displaying a menu screen, and to "0" if the title is not a title for displaying a menu screen. In the following 'if' statement, the name of a jar file in which the Java application is stored if "title_type" is "1" is given. An exemplary jar file name is "123.jar". In the following 'else' statement, a playlist file to be played back if "title_type" is "0" is given. An exemplary playlist file to be played back is "123.plst". "next_title_id" gives the "title_id" to be played back next after the completion of playback of the title currently being played back.

CPU 21 executes processing on the basis of the "Movie.title" file read from the optical disc 11 by the drive 12, according to the title information given at the head of the file. If the following conditions are satisfied, title_type=1 and title_attribute=0 then the title has content using a Java application, so CPU 21 reads and analyzes a file (e.g., "001.jar") which stores the Java application to be used.

FIG. 7 is a diagram showing an example of the structure of "001.jar", which corresponds to a jar file in the JAR folder in FIG. 2. The "001.jar" file in FIG. 7 includes three files: "test_img.png", "test.class", and "test$timer.class". "test_img.png" is a PNG format file obtained by compressing the image data used in this application. "test.class" and "test$timer.class" are executable files created by compiling the Java application into an executable format. The operation of "test_class" and "test$timer.class" will now be described by using the source code before compilation.

FIGS. 8 to 10 are diagrams showing a listing of source code for "test_class" and "test$timer.class" prior to compilation. The operation of the video image playback device will now be described on the basis of the source code illustrated in FIGS. 8 to 10.

Section T1 of the source code illustrated in FIG. 8 is the part that imports the packages necessary for executing the application. The "org.disc.net.DiscLocator" package, which is specific to the present embodiment, is provided for playlist playback because playlist playback is not supported by Java.

Section T2 of the source code illustrated in FIG. 8 is the part that declares variables. I_POS[ ] [ ] and the subsequent description indicates coordinate information of the image data "test_img.png" displayed by using the Java application.

FIGS. 11(a) and 11(b) are diagrams showing examples of images displayed by use of the Java application. FIG. 11(a) is a schematic diagram of the images expressed by "test_img.png", where (Xn, Yn) represents coordinate values in memory. Here, the coordinate information {0, 0, 128, 128} in the I_POS[ ] [ ] shown in section T2 of the source code in FIG. 8 means that a square area having vertices (two diagonally opposite vertices) with coordinates indicated by (X0, Y0)=(0, 0) and (X1, Y1)=(128, 128) is to be extracted and displayed. That is, an image of the numeral "1" is displayed. The displayed state (FIG. 11(b)) of the images in FIG. 11(a) will be described later.

Section T3 of the source code in FIG. 9 is the part that reads "test_img.png" and decodes the PNG file. After the decoding in section T3 is completed, the processing proceeds to section T4 of the source code. Sections T4 to T6 of the source code are parts that perform playback of a playlist (PlayList) of a trailer or the like which is to be played back until a menu screen is displayed. Here, "iPlayListID", which denotes the file name of the playlist to be played back, is "0" in section T4 of the source code, so playlist "000.plst" is played back. Similarly, "iPlayListID=1" is given in section T5 of the source code, so playlist "001.plst" is played back, and "iPlayListID=2" is given in section T6 of the source code, so playlist "002.plst" is played back. When playback of a playlist is designated in each of sections T4 to T5 of the source code, the corresponding playlist data are read from the optical disc 11 by the drive 12. The read data are separated into video information, audio information, and subtitle graphics information by the demultiplexer 13. The video image information is decoded in the video decoder 14; the audio information is decoded in the audio decoder 16; the subtitle graphics information is decoded in the subtitle decoder 15.

FIG. 12 is a diagram illustrating the syntax of a plst file for the video image information playback method according to this embodiment of the invention. The operation of CPU 21 when the process in section T4 of the source code is performed to control the playback of playlist "000.plst" will be described here. After the playback of playlist "000.plst" is started, the Java control unit in CPU 21 checks the playback time of playlist "000.plst" in the playlist playback unit at regular time intervals. During the playback of the playlist, in response to a check request from the Java control unit, the playlist playback unit reports the current playback time of the playlist. If the playback time of the playlist reported by the playlist playback unit matches the final time of playlist "000.plst", the Java control unit recognizes that the playback of playlist "000.plst" is completed, and executes the following process in section T5 to perform the playback of playlist "001.plst" by a similar sequence.

Section T7 of the source code is source code for executing a process to display a menu screen after the execution of the processes in sections T4 to T6 (after the trailer and other play lists are displayed). Since section T7 does not concern the essential part of the invention in the present application, it will not be described in detail.

Figure 13:
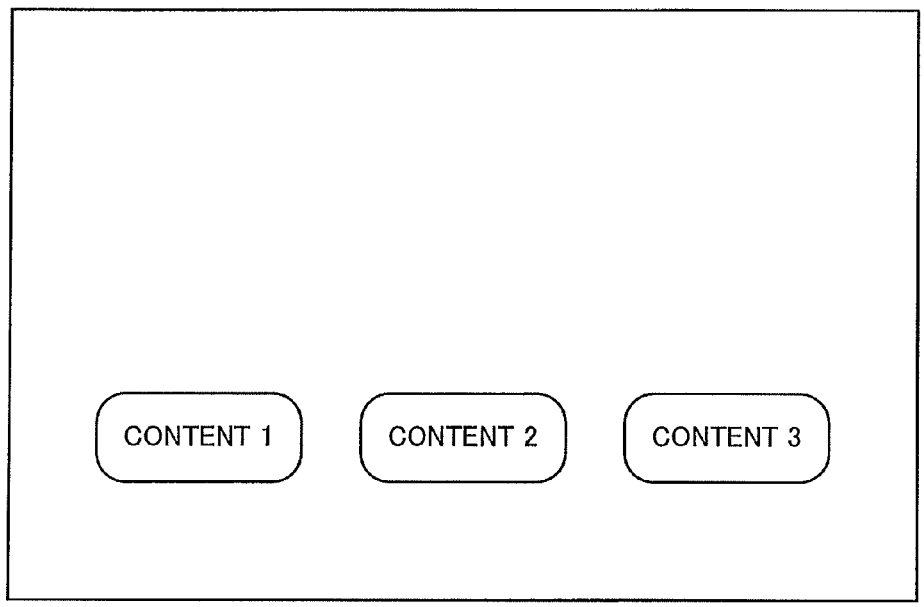
FIG. 13 is a diagram illustrating an exemplary menu screen according to the embodiment of the invention.

FIG. 13 is a diagram illustrating a menu screen displayed as a result of performance of the process in section T7 of the source code. The menu screen illustrated in FIG. 13 includes three selectable buttons, and any one of three main items of video content can selectively be played back by operation of the corresponding one of the three buttons. In this embodiment, the operation when the leftmost "content 1" is selected will be described.

FIG. 10 is a diagram illustrating source code for performing playback of the playlist that constitutes content 1. Once the "content 1" button is selected, processing is performed according to section T8 of the source code shown in FIG. 10. Section T8 uses the Java application to display the graphic images illustrated in FIG. 11(a) while the playlist "003.plst" is being played back. Specifically, the images '1' to '30' illustrated in FIG. 11(a) are superimposed on the playlist video picture 40 specified by "003.plst" and displayed sequentially at intervals of one second, for example, as in the 'scene No. 1' to 'scene No. 15' shown from top to bottom in FIG. 11(b). At this time, the graphics screens '1' to '30' in FIG. 11(a) generated by CPU 21, the output screen of the video decoder 14, and the output screen of the subtitle decoder 15 are superimposed by the graphics superimposing unit 17 and an image signal of the superimposed image is output to the external display device 31.

By using the Java application as described above, complex video playback can be performed, such as displaying various graphic images simultaneously on the main video image. The Java application is written, as in section T3 of the source code, so as to decode a PNG file used for displaying graphic images before playback starts. The reason for this is that the processes of decoding PNG data and JPEG data impose a significantly heavy load on a CPU specialized for playback, and graphics cannot be displayed smoothly if the CPU must perform decoding while executing the Java application. For this reason, there is a wait time of several tens of seconds to several minutes from when the user gives a command to start playback until the decoding of the PNG and other files is completed and the video playback image is actually displayed.

Next, a description will be given of a problem caused when the playback of content using a Java application is suspended and then resume playback is performed. For example, if playback is suspended when the '15' image shown in FIG. 11(a) is displayed, then in order to perform resume playback from the time of display of the '15' image it is necessary to save, in a nonvolatile memory such as a flash memory, the entire state of CPU 21 and all the information in its external memory (RAM) at the time of display of the '15' image. It would be difficult, however, to adopt this scheme in a consumer device configured with the minimum hardware needed for implementing the video playback function. Accordingly, when playback using the Java application is resumed, first the processes in sections T1 to T3 of the source code are re-executed and then playback is resumed from the head of the playlist (the '1' display screen), which is a considerable inconvenience for the user.

In order to solve the problem described above, the video image information playback device according to this embodiment performs a resume playback (also referred to as a 'simple resume playback') that starts playback without launching the Java application, treating the playlist as a playlist that does not use the Java application. This enables playback to begin quickly at the start of resume playback. In this case, since the Java application is not running, the '1' to '30' graphics are not displayed, but the main video picture from the video decoder 14 and the sound from the audio decoder 16, for example, are played back. For movie content of the type that is generally sold on the market, although some functions are restricted, the video picture, sound, and subtitles can be displayed, and that is enough to make the content understandable even when the Java application is not running.

Next, the procedure by which encrypted content is decrypted by exchange of data between the Java application of CPU 21 and a decryption application of the decryption processing CPU 18 will be described. When a playlist containing an encrypted stream file is played back, the "decrypt.prg" file in which the decryption application is stored is loaded into the decryption processing CPU 18 in FIG. 2. A virtual machine (differing from the Java virtual machine) for running the decryption application is implemented on the decryption processing CPU 18, and the decryption application is executed on this virtual machine. An advantage of executing the decryption application on the virtual machine is that this makes it very difficult to infer the nature of the computations performed on the decryption processing CPU 18, thereby providing immunity from hacking. The decryption application is loaded and at the same time a JAR file "xxx.jar" containing the Java application that exchanges data with the decryption application is loaded into CPU 21. The "xxx" is not expressly specified because it is given in the JAR file that was loaded for playback of the playlist.

Figure 14:
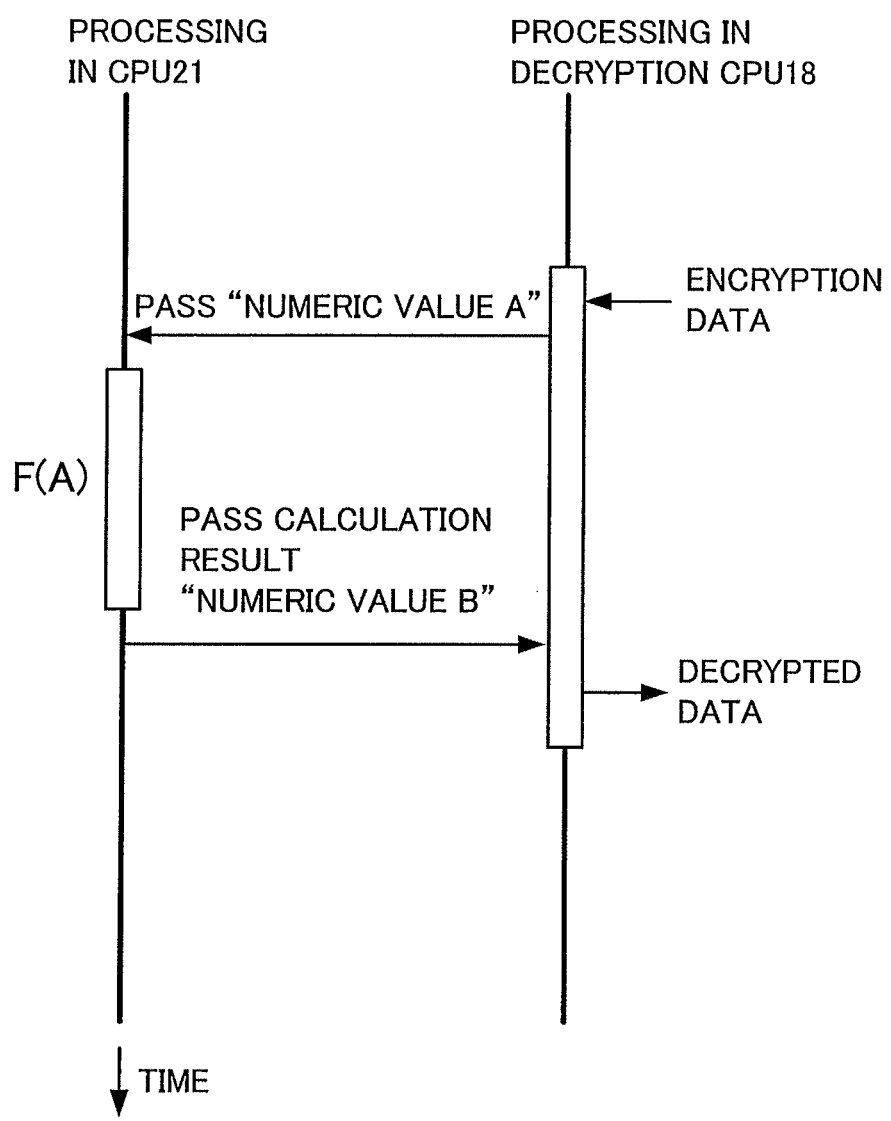
FIG. 14 is an operation sequence diagram illustrating processes in the video image information playback method according to the invention.

FIG. 14 is a normal playback sequence diagram illustrating data exchange between the decryption processing CPU 18 and CPU 21. As shown in FIG. 14, a "numeric value A" is passed from the decryption application in the decryption processing CPU 18 to the Java application in CPU 21. Here, "numeric value A" is an unspecified value generated as a result of processing in the decryption application of the decryption processing CPU 18.

Next, the Java application in CPU 21 computes a function F(A) by using the received "numeric value A".

Next, a "numeric value B" resulting from the computation of function F(A) is passed to the decryption application in the decryption processing CPU 18. The decryption application in the decryption processing CPU 18 performs a decryption process by using the computational result "numeric value B".

Encrypted content is decrypted by periodic performance of data exchanges as above. In the case described above, the data exchange between the Java application in CPU 21 and the decryption application in the decryption processing CPU 18 is a one-to-one data exchange of "numeric value A" for "numeric value B", but the correspondence between "numeric value A" and "numeric value B" is not limited to a one-to-one data exchange. For example, a two-to-one data exchange may take place, in which the decryption application in CPU 21 passes a "numeric value A" and a "numeric value C" to the Java application in the decryption processing CPU 18 and the Java application in CPU 21 returns the computed result of a function F(A, C) to the decryption application in the decryption processing CPU 18.

The above illustrates an operation during normal playback in which the Java application is loaded, but at the start of resume playback, playback is performed without launching the Java application. When the Java application is not launched, the decryption application cannot obtain the "numeric value B" required for the decryption process, so there is a problem: the normal decryption process cannot be carried out, and the normal video picture and sound cannot be reproduced.

The method by which encrypted content is decrypted normally at the start of resume playback by the video image information playback method and video image information playback device according to this embodiment, even without launching the Java application, will now be described. The Java application that exchanges data with the decryption application computes a prescribed function F(A) by performing calculations that can be understood from analysis of the JAR file. The calculations performed within the Java application can also be translated into a language other than Java. That is, the encrypted data can be decrypted at the start of resume playback, even without launching the Java application, by using C language or another language that runs natively on CPU 21 to carry out a proxy computational process equivalent to function F(A).

Figure 15:
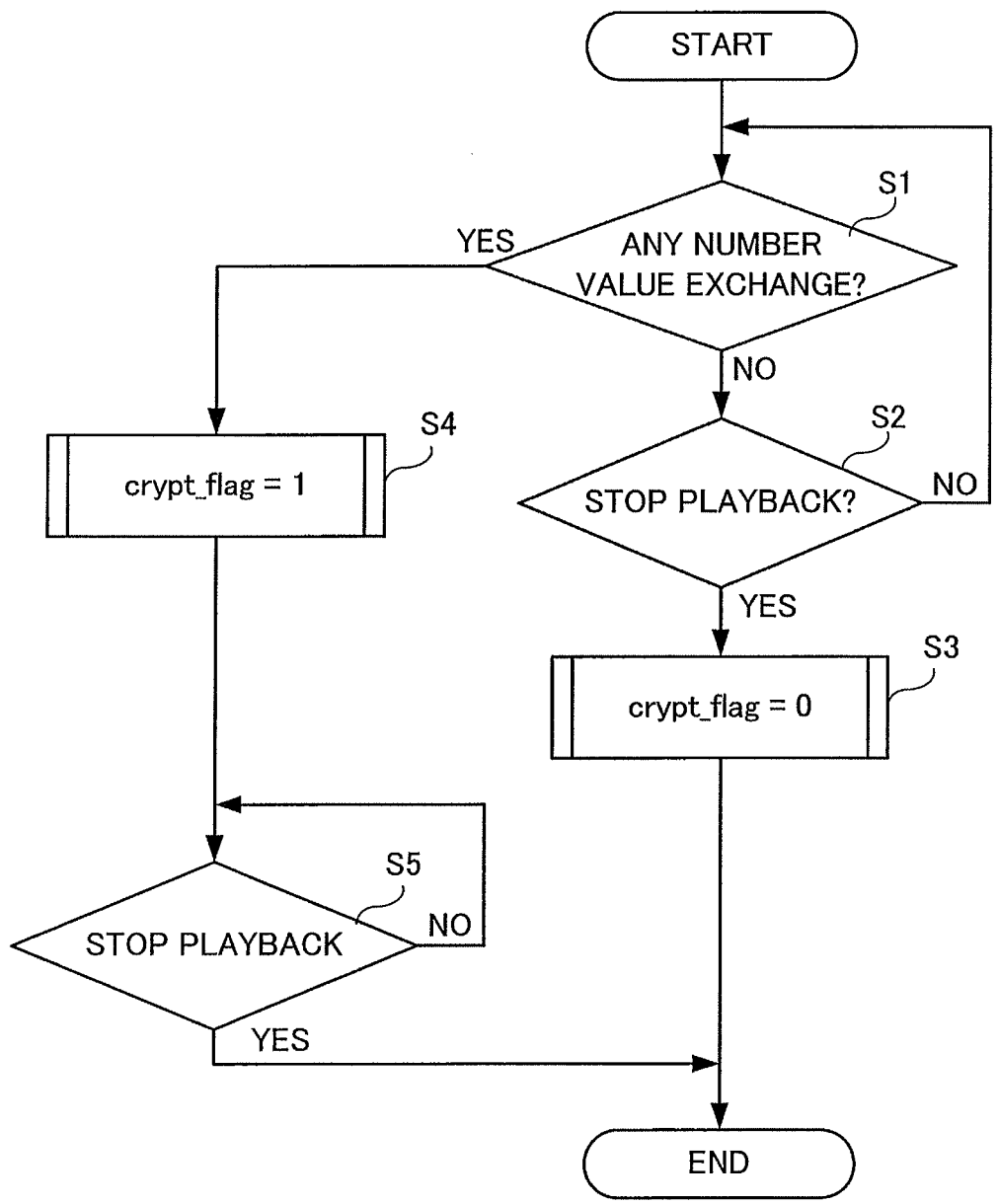
FIG. 15 is a flowchart illustrating a process in the video image information playback method according to the embodiment of the invention.

FIG. 15 is a flowchart illustrating a process performed by the Java application in CPU 21 when the exchange of numeric values between the Java application in CPU 21 and the decryption application in the decryption processing CPU 18 is detected in normal playback. As shown in FIG. 15, the Java application in CPU 21 monitors the occurrence of an exchange of numeric values (receiving a numeric value and sending a numeric value) with the decryption application in the decryption processing CPU 18 (step S1). If there is no exchange of numeric values with the decryption application (NO in step S1), then when the Java application in CPU 21 receives a playback stop command (YES in step S2), it sets a "crypt_flag" flag to "0" (step S3). If the Java application in CPU 21 detects the transfer of a numeric value from the decryption application in the decryption processing CPU 18 (YES in step S1), it sets the "crypt_flag" flag to "1" (step S4), and then when it receives a playback stop command (YES in step S5), it stops processing. Here, "crypt_flag" is an item of information held in a work memory of CPU 21; it is set to "1" when a numeric value is transferred from the decryption application in the decryption processing CPU 18, and otherwise set to "0". If it is necessary to retain this information even after the video image information playback device is powered off, the information must be held in the nonvolatile memory 22.

Figure 16:
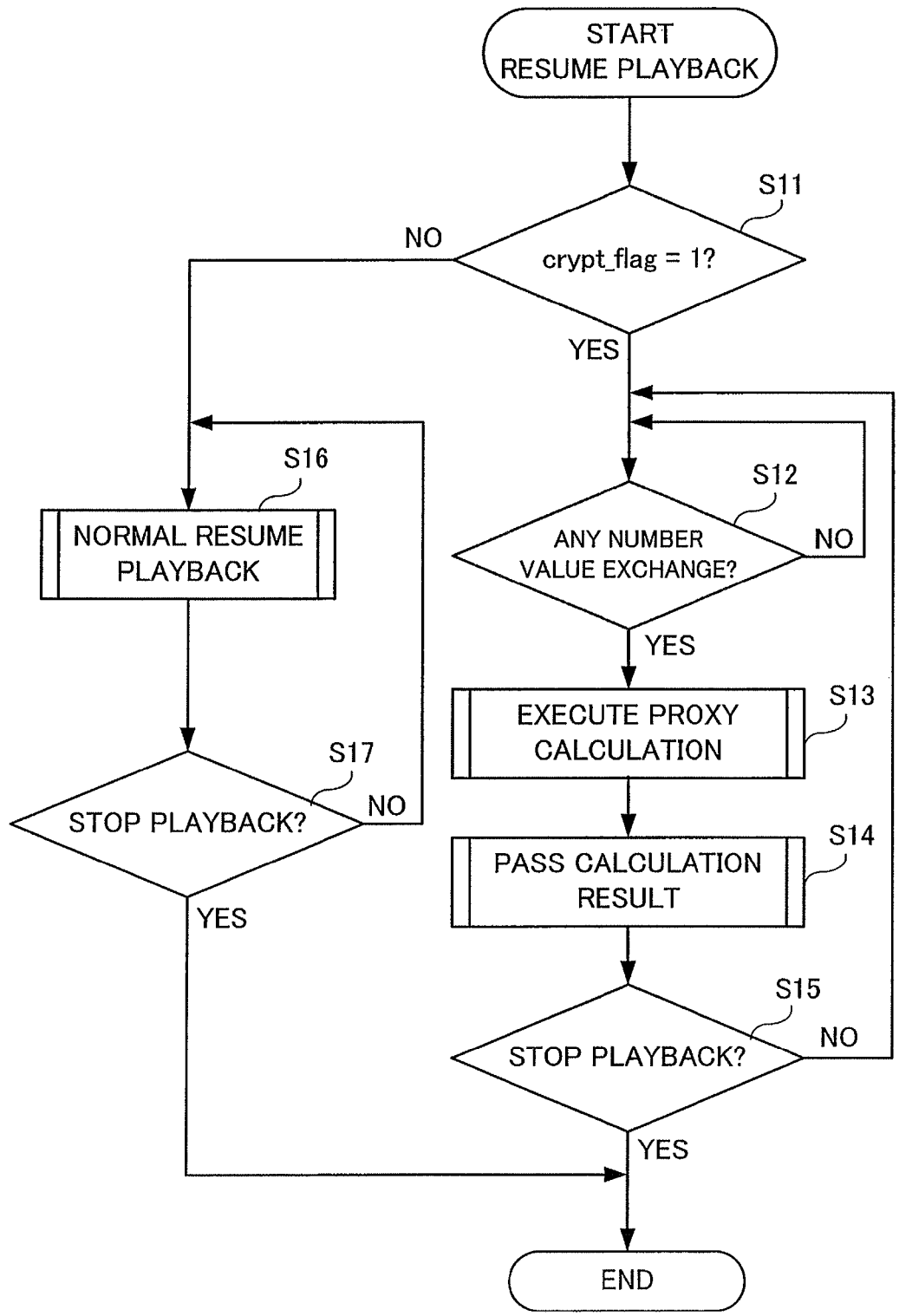
FIG. 16 is a flowchart illustrating a process in the video image information playback method according to the embodiment of the invention.

FIG. 16 is a flowchart illustrating the decryption process at the start of resume playback. As shown in FIG. 16, when CPU 21 receives a resume playback start command, it checks whether the value of the "crypt_flag" flag is set to "1" or not (step S11). If the value of the "crypt_flag" flag is not set to "1" (NO in step S11), this indicates content for which numeric values are not exchanged between the Java application and the decryption application, so normal resume playback is performed, not involving decryption by the decryption application (resume playback without using the proxy application) (step S16). If the "crypt_flag" flag is set to "1", the CPU 21 monitors the transfer of a "numeric value A" from the decryption application of the decryption processing CPU 18 (step S12). If the CPU 21 detects the transfer of a "numeric value A" from the decryption application, it executes a computation in place of the Java application by using a computational process for a function F'(A) in the Java application that is equivalent to the computational process for F(A) in the Java application and takes place in the proxy application, which is a proxy program coded in C language (step S13). The proxy application of CPU 21 transfers the computational result of function F'(A) to the decryption application in the decryption processing CPU 18 (step S14). The proxy application in CPU 21 iterates the processing from step S12 to step S14, thereby performing the decryption process for the encrypted content (step S15). If the Java application of CPU 21 detects the transfer of a "numeric value A" from the decryption application, it executes a computation in place of the Java application by using a computational process for a function F'(A) in the Java application that is equivalent to the computational process for F(A) in the Java application and takes place in the proxy application, which is a proxy program coded in C language (step S13). The proxy application of CPU 21 transfers the computational result of function F'(A) to the decryption application in the decryption processing CPU 18 (step S14). The proxy application in CPU 21 iterates the processing from step S12 to step S14, thereby performing the decryption process for the encrypted content (step S15).

As described above, in this embodiment, at the start of resume playback, even for content for which numeric values are exchanged between the Java application in CPU 21 and the decryption application in the decryption processing CPU 18, resume playback is started by running a proxy application, which is a simpler program than the Java application, instead of directly running the Java application. In this way, immediately after the reception of a resume playback command, the proxy application exchanges numeric values with the decryption application to decrypt the encrypted data, so playback can be started normally immediately after the issuance of the resume playback start command. Since the proxy application decrypts encrypted data by executing as a proxy application running in native mode on CPU 21, normal playback can begin immediately after the resume playback command.

Figure 18:
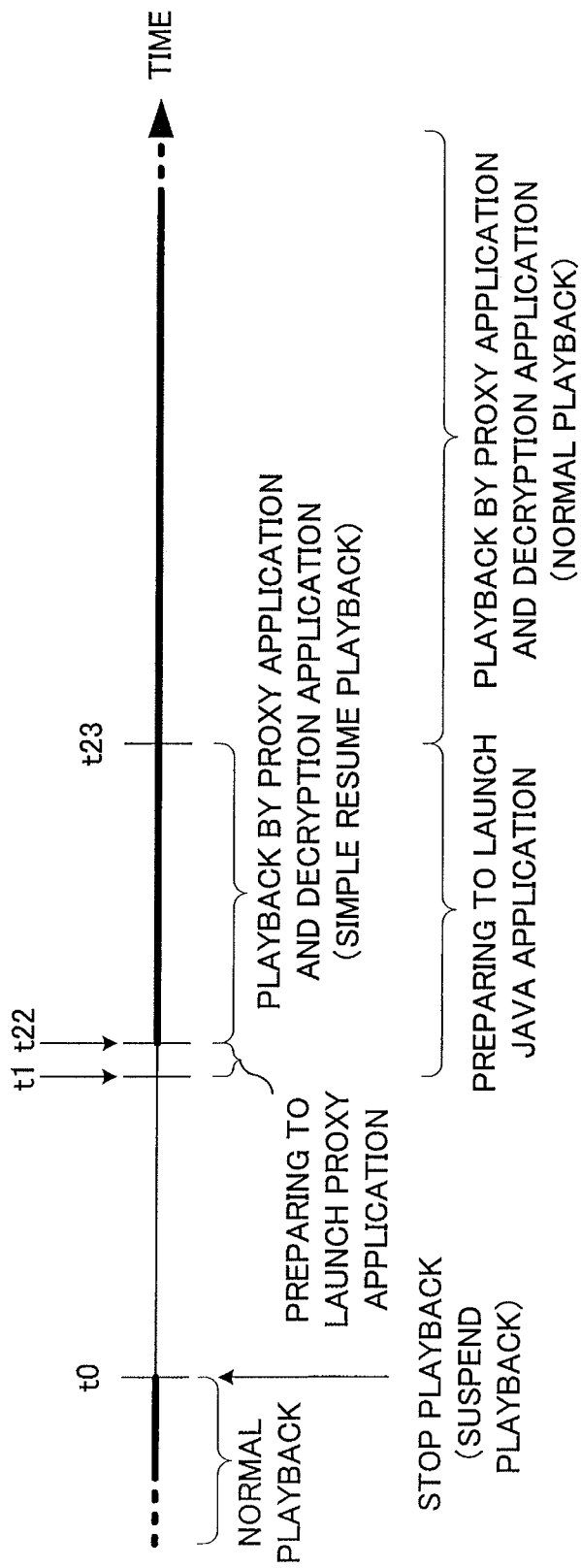
FIG. 18 is a timing diagram illustrating the process at the start of content playback in the video image information playback method according to the embodiment of the invention.

The effects of this embodiment will now be described in more detail. FIGS. 17(a) and 17(b) are timing diagrams illustrating processes at the start of content playback in video image information playback methods in comparative examples 1 and 2; FIG. 18 is a timing diagram illustrating a process at the start of content playback in the video image information playback method according to this embodiment.

In a video image information playback method that reduces the time until playback starts by, for example, treating content using a Java application as if it were content not using a Java application (comparative example 1), as shown in FIG. 17(a), normal playback is suspended at time t0, playback (functionally restricted playback) begins immediately after a playback starting operation is carried out at time t1, and a transition to normal playback takes place at time t2 after preparations to launch the Java application are completed.

In some cases, however, decryption of encrypted video image data and audio data of virtual-machine-based content is performed by data exchange between the decryption application and the Java application (comparative example 2). For such content, the Java application has to be launched, because if resume playback is performed without launching the Java application, the data cannot be decrypted. For this reason, as shown in FIG. 17(b), normal playback is suspended at time t0, but playback (functionally restricted playback) is not started immediately after the playback starting operation is performed at time t1; normal playback is started at time t12 after preparations to launch the Java application are completed.

As described above, the video image information playback methods in the comparative examples include a case in which resume playback starts immediately after the playback starting operation, as in FIG. 17(a), and a case in which resume playback starts after elapse of the time needed to prepare for resume playback following the playback starting operation, as in FIG. 17(b), in which case the waiting time until resume playback begins is not shortened.

In contrast, in the video image information playback method according to the present embodiment, as shown in FIG. 18, normal playback is suspended at time t0, the proxy application is launched immediately after the playback starting operation is performed at time t1, resume playback is started at time t22 when the proxy application is ready to be launched, and a transition to normal playback is made at time t23 after the Java application is ready to be launched. In this way, in the present embodiment, at the start of resume playback, even for content in which numeric values are exchanged between a Java application and a decryption application, normal playback can begin immediately after the instruction to resume playback, because resume playback is performed by running a proxy application, which is a simpler program than the Java application, in order to decrypt encrypted data, without immediately running the Java application. The proxy application is a program that includes the minimum components required to begin resume playback, and can start running in a shorter time than the Java application.

Figure 19:
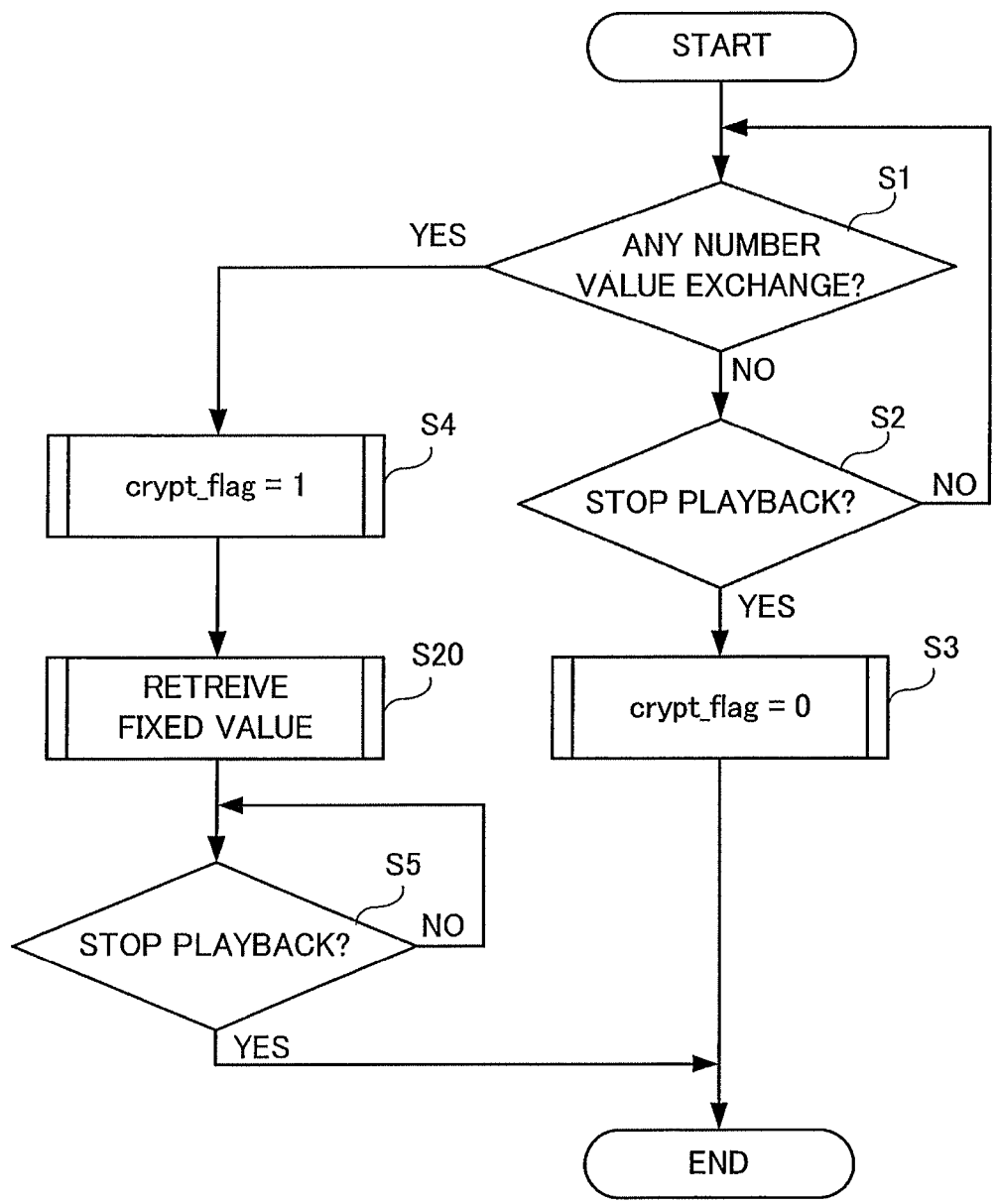
FIG. 19 is a flowchart illustrating another example of the process in the video image information playback method according to the embodiment of the invention.

FIG. 19 is a flowchart illustrating a process that improves on FIG. 16. Steps that are the same as in FIG. 16 are denoted by the same reference characters. In the process in FIG. 19, the computation of function F(A) is sometimes defined, for example, by use of a 'numeric value A' and a 'fixed value', as in 'F(A)="numeric value A" & "fixed value"'. This means that there is a case in which under some conditions 'F(A)="numeric value A"', and under other conditions 'F(A)="fixed value"'. The fixed value differs for each optical disc and F(A) also differs for each optical disc. Accordingly, it becomes impossible to perform the decryption process normally just from the computational result of the function F'(A) used by the proxy application to perform a proxy computation in CPU 21.

Therefore, the process in the example in FIG. 19 is performed in the following way. First, when CPU 21 detects an exchange of numeric values between the Java application and the decryption application (YES in step S1), it sets the value of the "crypt_flag" flag to 1 (step S4), analyzes the content of the JAR file including the Java application that exchanges numeric values with the decryption application, and executes a search for a fixed value included in function F(A) (step S20). Like the "crypt_flag" flag, the fixed value detected here is held in a work memory of CPU 21, and if it is necessary to retain this value even after power is turned off, the value is held in the nonvolatile memory 22. The processing at the start of resume playback is the same as the processing illustrated in FIG. 16, but in the proxy computation performed in step S13 in FIG. 16, it is necessary to compute F'(A) by using the fixed value obtained as above. In the example above, a case with a single fixed value is described, but more than one fixed value may be used.

As described above, when a fixed value used in function F(A) differs for each optical disc, the fixed value is retrieved from a jar file before simplified playback starts and function F'(A) is computed by using the retrieved fixed value, which enables decryption and normal reproduction of encrypted data.

REFERENCE CHARACTERS 10 playback unit, 11 optical disc (recording medium), 12 drive, 13 demultiplexer, 14 video decoder, 15 subtitle decoder, 16 audio decoder, 17 graphics superimposing unit, 18 decryption processing CPU, 21 CPU (playback control means), 22 nonvolatile memory, 31 external display device.

What is claimed is:

1. A video image information playback method for causing a video image information playback device to playing back a recording medium, the video image information playback device comprising a playback unit for playing back the recording medium on which virtual-machine-based content is recorded, enabling video playback to be controlled by a program running on a virtual machine, and a playback control unit for controlling execution of the program running on the virtual machine and playback processing in the playback, wherein:
   in normal playback of the virtual-machine-based content, a decryption support program, which is one of the plurality of programs running on the virtual machine, receives a numeric value from a decryption program for decrypting encrypted virtual-machine-based content;
   the decryption support program executes a prescribed computation by using the numeric value;
   the decryption program executes a decryption process by using a result of the computation; and
   at the start of resume playback, which is executed following an instruction to resume playback after playback of the virtual-machine-based content is suspended, a proxy program for carrying out a computational process equivalent to the decryption support program in place of the decryption support program that runs on the virtual machine in the playback control unit, and the video playback of the virtual-machine-based content is executed as the proxy program exchanges data with the decryption program.

2. The video image information playback method of claim 1, wherein:
   when the virtual-machine-based content is played back, data exchanges between the decryption support program running on the virtual machine and the decryption program are detected, and a flag value indicating whether such data exchanges are performed or not is set according to detected results; and
   at the start of resume playback, whether or not to launch the proxy program is determined from the flag value.

3. The video image information playback method of claim 1, wherein:
   when the virtual-machine-based content is played back, a fixed value used in a computation in the proxy program that communicates with the decryption program is retrieved from the program that runs on the virtual machine; and
   at the start of resume playback, the proxy program is executed by use of the retrieved fixed value.

4. A video image information playback device, comprising:
   a playback unit for playing back a recording medium on which virtual-machine-based content is recorded, enabling video playback to be controlled by a program running on a virtual machine; and a playback control unit for controlling execution of the program running on the virtual machine and playback processing in the playback unit, wherein:

in normal playback of the virtual-machine-based content, a decryption process for the virtual-machine-based content is executed by a decryption support program running on the virtual machine in the playback control unit and a decryption program for decrypting the encrypted virtual-machine-based content running on a decryption control unit in the playback unit; and at the start of resume playback, which is executed following an instruction to resume playback after playback of the virtual-machine-based content is suspended, a proxy program for carrying out a computational process equivalent to the decryption support program in place of the decryption support program that runs on the virtual machine in the playback control unit, and the video playback of the virtual-machine-based content is executed as the proxy program exchanges data with the decryption program.

5. The video image information playback device of claim 4, wherein:

when the virtual-machine-based content is played back, the playback control unit detects data exchanges between the decryption support program running on the virtual machine and the decryption program, and sets a flag value indicating whether such data exchanges are performed or not according to detected results; and at the start of resume playback, whether or not to launch the proxy program is determined from the flag value.

6. The video image information playback device of claim 4, wherein:

when the virtual-machine-based content is played back, the playback control unit retrieves a fixed value used in a computation in the proxy program that communicates with the decryption program from the program that runs on the virtual machine; and at the start of resume playback, the playback control unit executes the proxy program by using the retrieved fixed value.

\* \* \* \* \*